Feb. 27, 1934. C. E. BEARDSLEY 1,948,693
TOASTER
Original Filed March 21, 1930 2 Sheets-Sheet 1
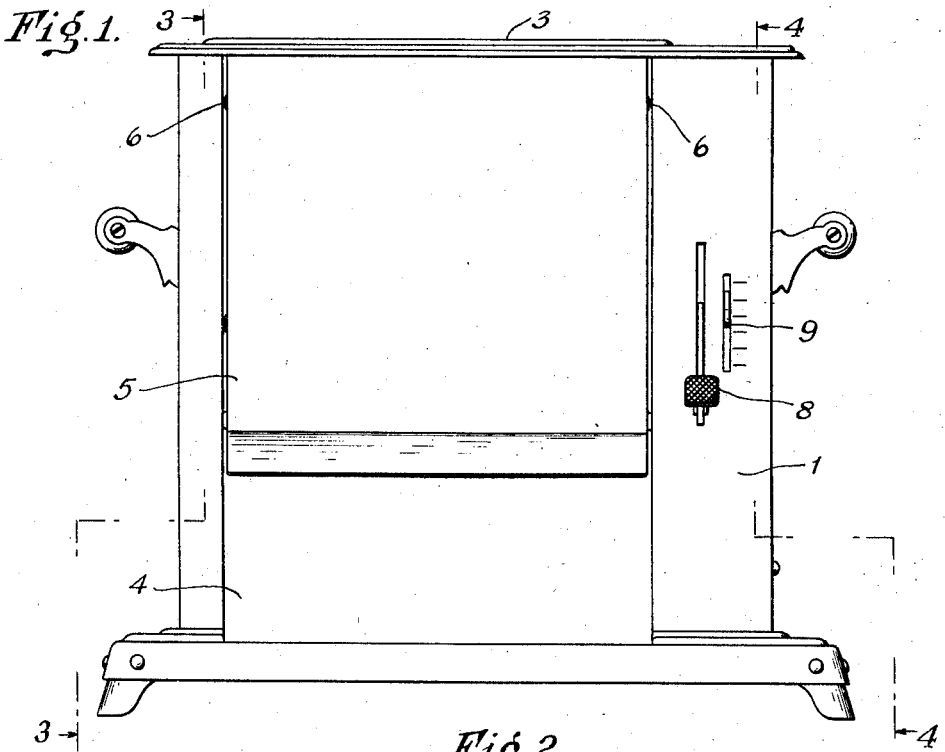
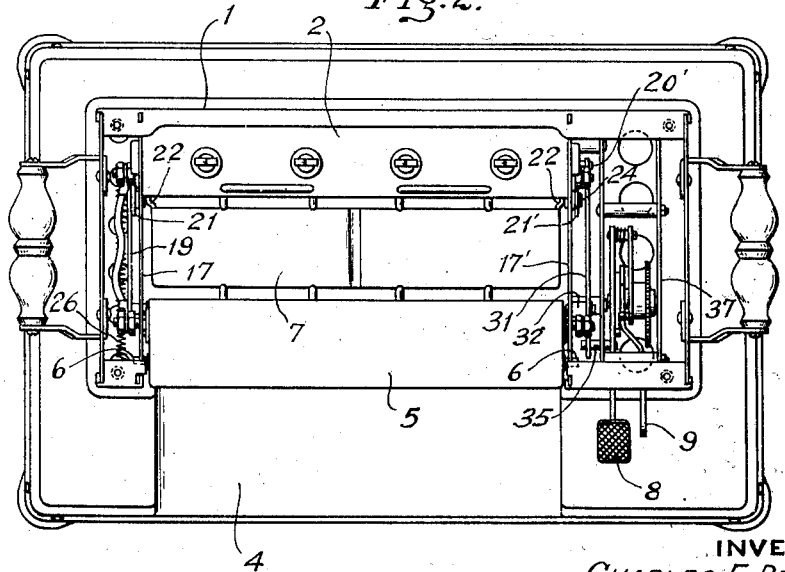
INVENTOR
CHARLES E. BEARDSLEY
BY
ATTORNEY Feb. 27, 1934.  C. E. BEARDSLEY  1,948,693
TOASTER
Original Filed March 21, 1930   2 Sheets-Sheet 2
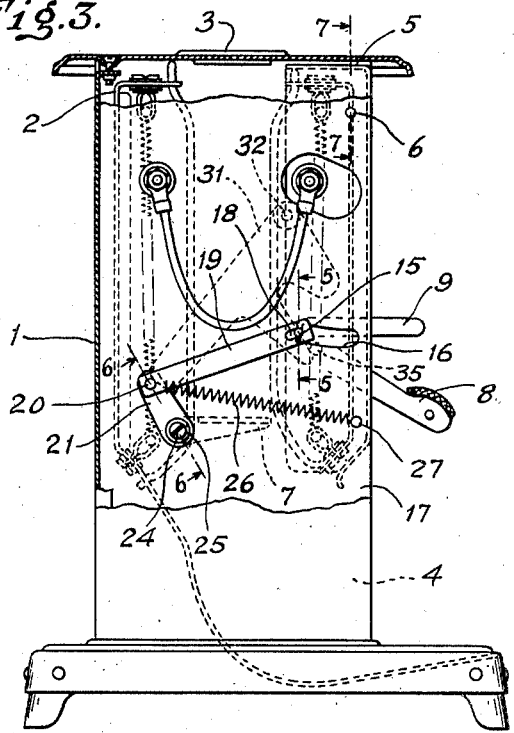
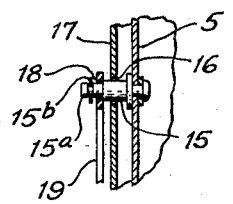
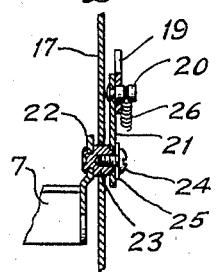
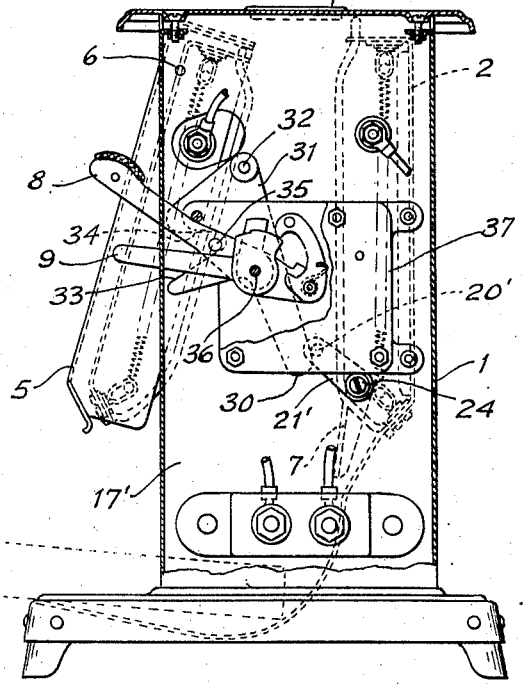
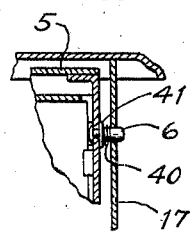
INVENTOR
CHARLES E. BEARDSLEY
BY
ATTORNEY Patented Feb. 27, 1934

1,948,693

UNITED STATES PATENT OFFICE 1,948,693

TOASTER

Charles E. Beardsley, Bethlehem, Conn., assignor to The Beardsley & Wolcott Mfg. Co., a corporation of Connecticut Application March 21, 1930, Serial No. 437,920. Renewed September 22, 1933

12 Claims. (Cl. 53—5)

My invention relates to toasters.

It has among its objects to provide an improved toaster construction of the type having a top inlet and a bottom outlet and a side member normally enclosing the toast and swinging outward to release the same. A further object of my invention is to provide an improved construction in this type of toaster wherein any tendency for the swinging member to bind during heating is overcome, and the swinging member is freely movable under all conditions. A still further object of my invention is to provide improved operative connections between the toast supporting member, usual in such devices, and said swinging member, whereby the mechanism is improved and simplified at the same time that a better balanced construction is produced. These and other advantages of my improved construction will, however, hereinafter more fully appear.

In the accompanying drawings I have shown for purposes of illustration a toaster constructed in accordance with my invention.

In these drawings,—

Figure 1 is a side elevation of the toaster;

Figure 2 is a plan view of the same with the cover removed;

Figure 3 is a sectional view substantially on a line 3—3 of Figure 1, with certain parts broken away to facilitate illustration;

Figure 4 is a sectional view substantially on a line 4—4 of Figure 1, certain parts also being broken away to facilitate illustration;

Figure 5 is a section on line 5—5 of Figure 3;

Figure 6 is a sectional view on line 6—6 of Figure 3.

Figure 7 is a sectional view on line 7—7 of Figure 3.

In this illustrative construction, it will be noted that I have illustrated a well known type of toaster comprising a frame 1, carrying therein a stationary heater and grid unit 2 and having a top inlet 3, and a bottom lateral outlet 4, while disposed above the latter is a swinging heater and grid carrying unit 5 movable about pivots 6 near its top on the frame. As usual, this member 5 occupies the "in" position shown in Figure 3 during toasting and is movable to the position shown in Figure 4 simultaneously with the depression to the position shown therein of a toast support 7 which also during toasting occupies the position shown in Figure 3. It will also be noted that as usual in this type of toaster, the swinging member 5 is movable from the position shown in Figure 4 to that shown in Figure 3 upon downward movement of an operating member 8 at one end of the toaster while the time that the swinging element 5 remains in the position shown in Figure 3 is determined by time controlled mechanism adjacent and controlled by a setting lever 9 at the same end of the toaster, herein the right hand end in Figure 1.

In my improved construction, it will be noted that the swinging element 5 has riveted to its left hand end wall a pin 15 which in the "in" position of the member 5 shown in Figure 3 is spaced substantially to the left of a vertical line extending through the pivot 6. Moreover, it will be noted that this pin is herein substantially below the pivot 6 and below the middle of the member 5. As shown, the pin 15 also extends through an arcuate slot 16 in the adjacent inside end member 17 of the frame and occupies a position at the left hand end of this slot as shown in Figure 3 when the member 5 is in its "in" position, and a position at the outer end of that slot when the member 5 is in its "out" position. As shown in Figure 5, the pin is also provided with a reduced protruding end 15a beyond the slot 16 which extends into a short straight slot 18 in the front end of a link 19 and is grooved to receive a suitable holding clip 15b. As shown, the link 19 extends between the pin 15 and a pin 20 projecting in the same direction and carried on the end of a crank 21 fixed to and rotatable with the toast support 7. Herein it will also be noted (Fig. 6) that the latter is in the form of a single piece of stamped metal having integral ears 22 which are riveted at their outer ends to sleeves 23 extending through the end members 17 and 17' and suitably journaled thereon. As shown, the outer ends of these sleeves 23 are also received and seated in the cranks 21, 21' and also receive screws 24 clamping holding washers 25 against the outer sides of cranks 21, 21'. It will also be noted that a coiled spring 26 is connected between the protruding ends of the pin 20 and a pin 27 carried on the frame member 17 at a point beneath the pivot 6 and closely adjacent the front edge of the member 17.

Referring now to the operative connections at the opposite end of the device, it will be noted that that end of the member 7 is provided with a like pivotal mounting to that heretofore described, and with a similar crank 21' and pin 20' disposed in the same position. In this instance, however, there is no link and spring construction corresponding to the link 19 and spring 26. Herein, also the pin 20' engages a lower rounded extremity 30 on a pivoted cam member 31. This member 31 is of a usual type, though without the usual upper slot, and is pivoted at 32 at its top and located parallel to the actuating lever 8 and between it and the frame member 17', while it also has cam surfaces 33 and 34 at its front engageable with a laterally protruding pin 35 on the actuating lever 8. Thus, when this member 8 is moved from the position shown in Figure 4 downward about its pivot, herein indicated at 36, the pin 35 engages the portion 33, and swings the member 31 backward simultaneously with the depression of the member 8 while when the member 8 is released, the pin 35 engages the surface 34 and moves the member 31 reversely. Attention is here also directed to the fact that the rounded depending end 30 on this member moves in opposite directions relative to the pin 20' and that consequently the crank 21' together with the member 7, pin 20 and crank 21 are moved from the position shown in Figure 4 to the position shown in Figure 3 when the member 31 is depressed and released when it is moved reversely. Here, it will of course also be understood that associated with the members 8 and 9 is suitable time controlled mechanism, generally indicated at 37 and carried in a suitable frame fixed to the frame 1, this mechanism being of the latch type common in such mechanisms and operative to effect an automatic release and quick reverse movement of the member 8. Herein, however, it seems unnecessary to describe this mechanism in detail other than to say that after a predetermined interval, determined by the adjustment of the lever 9, the member 8 is reversely thrown with a snap action to cause it to release the portion 33 and engage the portion 34 and swing the member 31 reversely about its pivot into its initial position. It will also be noted that the member 31 is in no way connected to this mechanism save through the pin 35 and portions 33 and 34, while the member 31 is also in no way connected to the frame 1 save at its pivot 32.

In order further to overcome any binding of the swinging member 5 in its supporting frame members 17 and 17', I have also provided light coiled springs 40 on each of the pivot pins 6 and acting between shoulders 41 thereon and the adjacent surfaces of the frame members. Thus it will be observed that these springs tend constantly to space the member 5 from the members 17 and 17', in such manner as to assist in enabling the free movement thereof at all times. It will, however, be understood, that these springs, while embodied in the preferred form of the construction, may be omitted, if desired.

In the operation of the device, it will be understood that prior to the insertion of toast from the top, the member 8 is moved from the position shown in Figure 4 to the position shown in Figure 3 in such manner as to move the member 5 from its open position to its closed position, and also to move the member 7 from its depending position illustrated in Figure 4 to its horizontal or toast supporting position shown in Figure 3. The parts will remain in this position for a length of time determined by the adjustment of the member 9. Thus, during toasting, the pin 15, link 19, pin 20, crank 21, and spring 26 will assume the position shown in Figure 3, with the pin 15 in the right hand end of the slot 18 in the link 19, while the crank 21' and pin 20', on the opposite end of the member 7, will be in the same position as the members 20 and 21. Also, the end 30 of the member 31 will be in engagement with the pin 20', so long as the pin 35 on the lever 8 engages the cam surface 33 of the member 31. When, however, the predetermined time period has elapsed, and the pin 35 engages the portion 34 of the member 31, the spring 26 will be free to function. When the parts are thus released, this spring 26 acts upon the pin 20 and swings the cranks 21 and 21' together with the member 7 from the position shown in Figure 3 to the position shown in Figure 4. Simultaneously, the link 19 is moved from the position shown in Figure 3 to the right in such manner as to bring the left hand end of its slot 18 into a smart engagement with the pin 15 carried by the member 5, and thus drive that pin to the opposite end of the slot 16 in the frame member 17 and hold it in that position wherein the member 5 is swung fully out. Thus, the normal tendency of the member 5 to swing outward, due to the location of its pivots, is increased substantially by the action of the spring 26 and link 19, and the member 5 is accordingly moved through a wider range simultaneously with the dropping of the toast support 7. Moreover, due to the action of the spring and the link, it will be noted that the part 5 is moved quickly and with sufficient force to free it from toast tending to stick to the same and insure a full opening movement irrespective of the temperature. It will also be evident that when the member 5 is returned to closed position, it is pulled back and held back by the engagement of its pin with the front end of the slot in the link.

As a result of my improved construction, it is found that even when the toaster is very hot, there is no tendency for the member 5 to stick in its "in" position. Instead, it is moved out certainly and quickly by the new mechanism and is also freely and certainly movable to its "in" position at any time. Moreover, due to the provision of my improved mechanism, it is made possible to simplify the structure of the member 31 and frame member 17' and to eliminate the pin heretofore provided on that end of the member 5 and moving through slots in both the frame member 17' and the member 31. It will further be noted that the structure is such as to improve the balance of the member 5 while eliminating any need for the spring previously connected to the member 31 and between it and a lever corresponding to the member 8. At the same time it will be noted that while obtaining the advantages of my improved construction, an exceedingly inexpensive construction is provided. These and other advantages of my improvement will, however, be clearly apparent to those skilled in the art.

While I have in this application specifically described one embodiment which my invention may assume in practice, it will be understood that this form of the same is shown for purposes of illustration, and that the invention may be modified and embodied in other forms without departing from its spirit or the scope of the appended claims.

What I claim as new and desire to secure by Letters Patent is:—

1. In a toaster, a casing having openings at the top and bottom thereof forming an inlet and an outlet for the material to be toasted, a stationary vertical heating element on one side of said casing, a movable vertical heating element spaced from said stationary element, said movable element being mounted to swing away from said stationary element about an axis near the top of said casing, and a spring actuated link member joining said stationary and movable elements and having a pin and slot connection with said movable element, means for normally holding said movable element in closed position against the action of said spring, and means for releasing said last mentioned means to cause the movable element to be snapped open quickly.

2. In a toaster having a swinging side member and a co-operating swinging toast supporting member, and opening and closing mechanism for said side member having a member pivotally connected to both said side member and supporting member, and a spring normally holding both said side member and supporting member in inoperative position.

3. In a toaster having relatively swinging toast supporting and side members, cranks on opposite ends of said supporting member, means for swinging one of said cranks, and operative connections between the other crank and said side member.

4. In a toaster having relatively swinging toast supporting and side members, said members being movable relative to each other, cranks on opposite ends of said supporting member, means for swinging one of said cranks, and operative connections between the other crank and said side member having a slot and pin connection with the latter member.

5. In a toaster, a frame having a top inlet and a bottom outlet, and a swinging side member, and mechanism for swinging said side member having an operating member at one end of said side member and time-controlled automatic operating mechanism connected to the opposite end of said side member.

6. In a toaster, a frame having a top inlet and a bottom outlet, a swinging toast support, and a swinging side member pivoted at the top of said frame, and mechanism for swinging said support and said member operating on said support at one end of said side member and on said member at the opposite end thereof.

7. In a toaster having a top inlet, a bottom outlet, and a swinging side member therebetween, a toast supporting member having cranks on its opposite ends, swinging means for said side member connected to one crank, and crank actuating and releasing means operating on the other crank.

8. In a toaster, a frame having a top inlet and a bottom outlet, a swinging side member therebetween pivoted at the top of said frame, a toast supporting member, means for swinging the latter with respect to said side member, and means connected to said supporting member having a slot and pin connection with said side member.

9. In a toaster, a frame having a top inlet and a bottom outlet, a swinging side member therebetween pivoted at the top of said frame, a toast supporting member, means for swinging said toast supporting member relative to said side member, and means connected to said supporting member having a slot and pin connection with said side member at the opposite end thereof from said swinging and releasing means.

10. In a toaster, a frame having a top inlet and a bottom outlet, a swinging side member therebetween pivoted at its top and normally biased to closed position, a toast supporting member movable into and out of supporting position, slot and pin connections between said member and said side member, and resilient means for urging said members to open position.

11. In a toaster having a top inlet, a bottom outlet, and a swinging side member therebetween pivoted at its top and normally biased to closed position, a toast supporting member, resilient means normally holding the latter in open position, and operative connections between said member and said side member movable by said resilient connections.

12. In a toaster, a frame having a top inlet and a bottom outlet, co-operating toasting means thereon including a swinging side member pivoted at its top, resilient means on its pivots spacing the ends of said side member from said frame, a toast supporting member, means connected to said members for swinging the toast supporting member with respect to said side member, and means movable by said supporting member and connected to said swinging side member.

CHARLES E. BEARDSLEY.